(12) United States Patent
Nguyen

(10) Patent No.: US 12,710,234 B2
(45) Date of Patent: Aug. 18, 2026

(54) MODULAR DOUBLE BRAZED PHASE-CHANGE MATERIAL HEAT EXCHANGER

(71) Applicant: Blue Origin Manufacturing, LLC, Huntsville, AL (US)

(72) Inventor: Khoi Nguyen, Edmonds, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 305 days.

(21) Appl. No.: 18/302,632

(22) Filed: Apr. 18, 2023

(65) Prior Publication Data

US 2024/0353184 A1 Oct. 24, 2024

(51) Int. Cl.
*F28D 20/02* (2006.01)
*B64G 1/58* (2006.01)

(52) U.S. Cl.
CPC ............. *F28D 20/021* (2013.01); *B64G 1/58* (2013.01); *F28D 20/023* (2013.01); *F28F 2215/02* (2013.01); *F28F 2275/04* (2013.01)

(58) Field of Classification Search
CPC .......... F28D 20/00; F28D 20/21; F28D 20/02; F28D 2021/0021; F28F 2215/02; F28F 3/027; F28F 2275/04
See application file for complete search history.

(56) References Cited

U.S. PATENT DOCUMENTS 10,897,892 B1 * 1/2021 Sole ..................... A01N 1/0268
2009/0236071 A1 * 9/2009 Jensen .................... F28D 20/02 165/10
2017/0260103 A1 9/2017 Doud et al.
2020/0058967 A1 * 2/2020 Berge .................. H01M 50/209
2023/0087209 A1 * 3/2023 Holt ......................... B64G 1/50 244/117 R

FOREIGN PATENT DOCUMENTS

CN 108469195 A * 8/2018
CN 109163592 A * 1/2019 ........... B60H 1/3201
CN 116293530 A * 6/2023
FR 2975177 A1 * 11/2012 ......... F28D 1/05366

* cited by examiner

*Primary Examiner* — Harry E Arant
(74) *Attorney, Agent, or Firm* — Summit Patents, PC

(57) ABSTRACT

A phase change material (PCM) heat exchanger system for a rocket or other spacecraft is described. The PCM heat exchanger utilizes phase-change material to store heat absorbed from a hot working fluid. The PCM heat exchanger may be configured as an integrated modular double brazed layout that includes folded fins to distribute heat from a working fluid (e.g., hydraulic fluid) to PCM. A modular configuration may enable a heat exchanger system to be scaled up or down by adding or removing modules to meet cooling requirements for particular rockets and their flights.

13 Claims, 4 Drawing Sheets

MODULAR DOUBLE BRAZED PHASE-CHANGE MATERIAL HEAT EXCHANGER

BACKGROUND

Heat exchangers, such as those used for cooling hydraulic fluids, generally have a monolithic design that integrates multiple tubes to exchange heat between different working fluids. These heat exchangers have cross-flow or counter-flow configurations, for example, due to having different working fluids flowing at certain rates. These heat exchangers may also be active systems that require relatively complex control algorithms to function.

For example, hydraulic oil coolers for aircraft may be heat exchangers embedded in fuel tanks using the fuel as coolant. However, this type of cooler may not be mass efficient because the coolant does not boil during the cooling process. Though boiling coolant as part of a cooling process is preferred for spaceflight applications to save mass, it is a difficult to achieve and control in microgravity. Thus, a spraying architecture may be used instead. This latter type of cooling architecture may be performed by a water spray boiler (WSB), which was used on the Space Shuttle.

Though the WSB has been used numerous times with success, there have also been problems. For example, because the WSB is generally operated during space flight where temperatures are very cold, freezing of coolant (e.g., water) may occur and block flow of the coolant or vents thereof. Another problem with a WSB is its mass, which is relatively high and undesirable for space flight, where mass considerations are particularly important.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
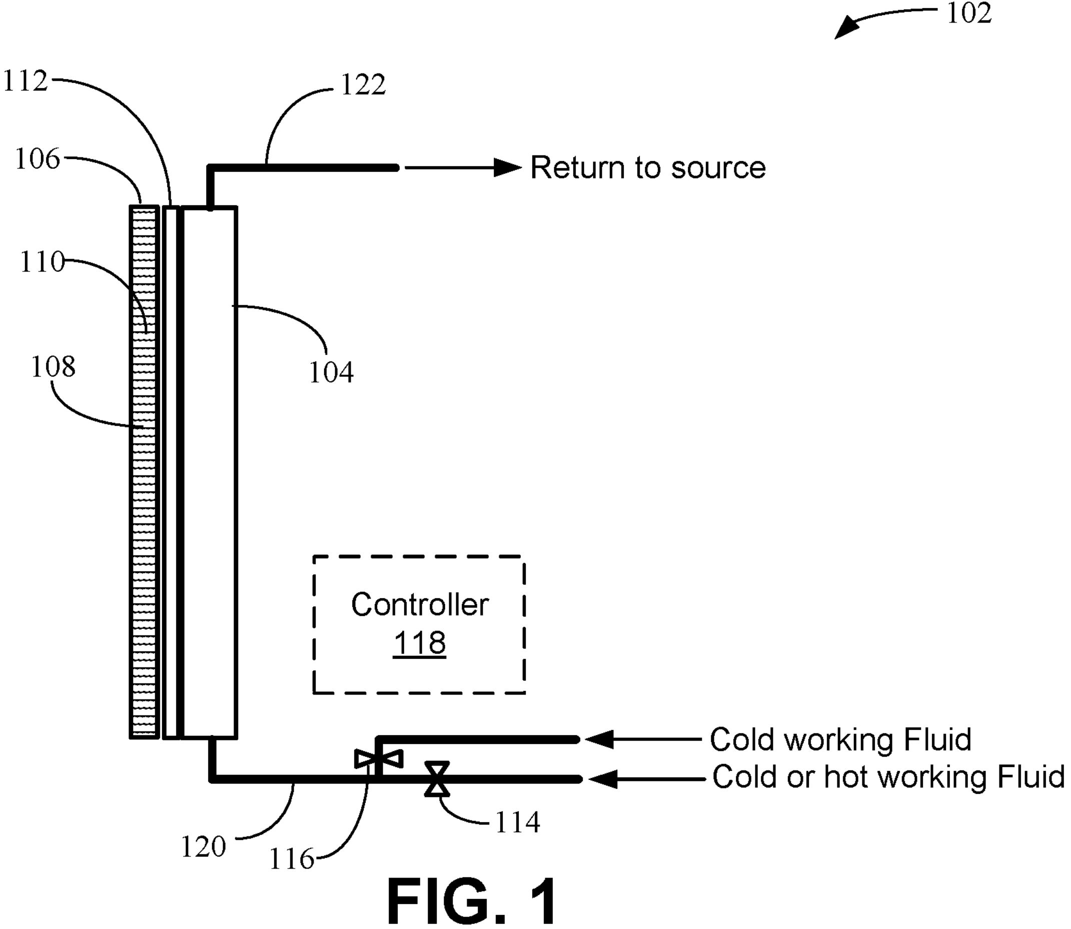
FIG. 1 is a schematic depiction of a phase change material (PCM) heat exchanger, according to some embodiments.

This disclosure describes architectures and methods of operation for a phase change material (PCM) heat exchanger system for a rocket or other spacecraft. For example, a PCM heat exchanger utilizes phase-change material to store heat absorbed from a hot working fluid. The PCM heat exchanger may be configured as an integrated modular double brazed layout that includes folded fins to distribute heat from a working fluid (e.g., hydraulic fluid) to a PCM. Such a modular configuration may enable a heat exchanger system to be scaled up or down by adding or removing modules to meet cooling requirements for particular rockets and their flights. The integrated modular double brazed layout may be fabricated using brazing, which is a metal-joining process in which two or more metal items are joined together by melting and flowing a filler metal into the joint, with the filler metal having a lower melting point than the adjoining metal.

The PCM heat exchanger described herein may provide a number of benefits. For example, the PCM heat exchanger does not involve coolant flow on the PCM side of the heat exchanger because the PCM (a non-flow entity) is used for heat storage. Also, the relatively passive nature of the PCM to absorb and release heat may lead to systems that need not include complicated control systems, thereby reducing weight, increasing reliability, and improving reusability by allowing the systems to reset under ambient conditions between flights.

In some embodiments, a heat exchanger system for a rocket may include a heat exchange component that is configured to carry a working fluid to be cooled, such as a hydraulic or other fluid. In some implementations, described below, the heat exchange component may carry a working fluid that is relatively cold so as to cool (e.g., reset) PCM in the heat exchanger system. In addition to the heat exchange component, the heat exchanger system may include a PCM component comprising PCM, which is in thermal contact with the heat exchange component. The heat exchange component and the PCM component may include lanced offset fins. For example, the PCM component may comprise a support matrix having a lanced offset fin configuration that includes a network of cavities at least partially filled with PCM. The lanced offset fins provide relatively efficient thermal conduction from outside the PCM component to substantially all portions of the PCM in the support matrix.

A lanced offset fin configuration may provide a number of advantages for use in space vehicles. For example, it is relatively compact with a high heat-transfer-surface-area to volume ratio. A lanced offset fin configuration may be fabricated from aluminum or aluminum alloy (e.g., a brazed aluminum heat exchanger), or other metals, such as stainless steel.

The heat exchanger system may also include a working-fluid supply system configured to provide the working fluid to the heat exchange component such that the working fluid is i) hotter than the melting temperature of the PCM during flight of the rocket and ii) colder than the melting temperature of the PCM when the rocket is stationary on a launch pad for the rocket. For example, the working-fluid supply system may include valves and a controller that operate to select either the working fluid that is hotter than the melting temperature of the PCM or the working fluid that is colder than the melting temperature of the PCM. The selection by the valves may be based, at least in part, on a determination of i) location of the rocket or ii) phase of the PCM.

In some embodiments, a method of operating a heat exchanger or heat exchanger system in a rocket may include i) conveying (e.g., pumping, pushing, moving) working fluid through a heat exchange component that is in thermal contact with a PCM component comprising PCM, and ii) providing the working fluid to the heat exchange component such that the working fluid is a) hotter than the melting temperature of the PCM during flight of the rocket and b) colder than the melting temperature of the PCM when the rocket is stationary on a launch pad for the rocket. The PCM component may comprise a lanced offset fin structure, mentioned above, having a network of cavities at least partially filled with the PCM. The method may further include determining a location of the rocket and selecting, based on the determined location of the rocket, either the working fluid that is hotter than the melting temperature of the PCM or the working fluid that is colder than the melting temperature of the PCM. The selecting may include operating one or more valves that carry the working fluid. In some implementations, the method may further include measuring a temperature difference between the working fluid entering the heat exchange component and the working fluid exiting the heat exchange component, and determining, based on the measured temperature difference, a phase of the PCM. In these implementations, selecting working fluid that is hotter or colder than the melting temperature of the PCM may be based on the determined phase of the PCM. For example, if the phase of the PCM is liquid, then the working fluid may be selected to be colder than the melting temperature of the PCM so that the working fluid can freeze (e.g., reset) the PCM, such as during a period between flights. If the phase of the PCM is solid, then the working fluid may be selected to be hotter than the melting temperature of the PCM so that the heat exchanger can cool the working fluid, such as during a flight of the rocket.

FIG. 1 is a schematic depiction of a phase change material (PCM) heat exchanger system 102, according to some embodiments. Heat exchanger system 102 may be incorporated in a rocket, for example, to cool fluids that circulate through hydraulic systems, engines, or other mechanical components. Such fluids, herein called working fluids, may be hydraulic fluids, engine oils, or water, just to name a few examples. Heat exchanger system 102 includes a PCM to absorb heat from the working fluid.

When the absorbed heat raises the temperature of a solid PCM to its melting point, the PCM begins to melt. The heat energy required to melt the PCM to a liquid is called the heat of fusion. During such a process of melting, the temperature of the PCM remains constant. After all the PCM is melted to a liquid, the temperature rises as the PCM liquid absorbs more heat energy. Thus, the heat of fusion is one of the principal working features of a PCM for dealing with heat that is unwanted in a thermal system (e.g., an engine or hydraulic system). In other words, solid PCM is able remove heat energy from a thermal system by absorbing and storing the heat energy during a phase change of the PCM. The PCM stores a maximum amount of heat energy (without a temperature rise of the system) at the point when the PCM becomes completely melted. In a reverse process, the PCM may be “reset” to a solid from a liquid by removing heat energy from the PCM. In this case, heat exchanger system 102 may use a working fluid that is colder than the melting point of the PCM to freeze the PCM so that the PCM can be used later for its primary task of absorbing and removing heat energy from the thermal system, as explained below.

Heat exchanger system 102 may include a heat exchange component 104 and a PCM component 106 comprising PCM 108, which is in thermal contact with the heat exchange component. The heat exchange component and the PCM component may include lanced offset fins, described below. For example, PCM component 106 may comprise a support matrix 110 having a lanced offset fin configuration that includes a network of cavities at least partially filled with PCM. The lanced offset fins provide efficient thermal conduction from outside PCM component 106 to substantially all portions of PCM 108 in support matrix 110. In some implementations, heat exchanger system 102 may also include lanced offset heat fins 112 between heat exchange component 104 and PCM component 106.

Heat exchanger system 102 may also include a working-fluid supply system that may include a control system, valves, piping, and storage tanks, for example. The working-fluid supply system may be configured to provide working fluid to heat exchange component 104 such that the working fluid is i) hotter than the melting temperature of the PCM during flight of the rocket and ii) colder than the melting temperature of the PCM when the rocket is stationary on a launch pad for the rocket. For example, the working-fluid supply system may include valves 114 and 116 that may be operated by a controller 118 to select either the working fluid that is hotter than the melting temperature of the PCM or the working fluid that is colder than the melting temperature of the PCM. The selection by the valves may be based, at least in part, on a determination of location of the rocket or phase of the PCM, as explained below. The working fluid may be supplied to heat exchange component 104 via pipe 120 and the working fluid may exit the heat exchange component via pipe 122.

Figure 2:
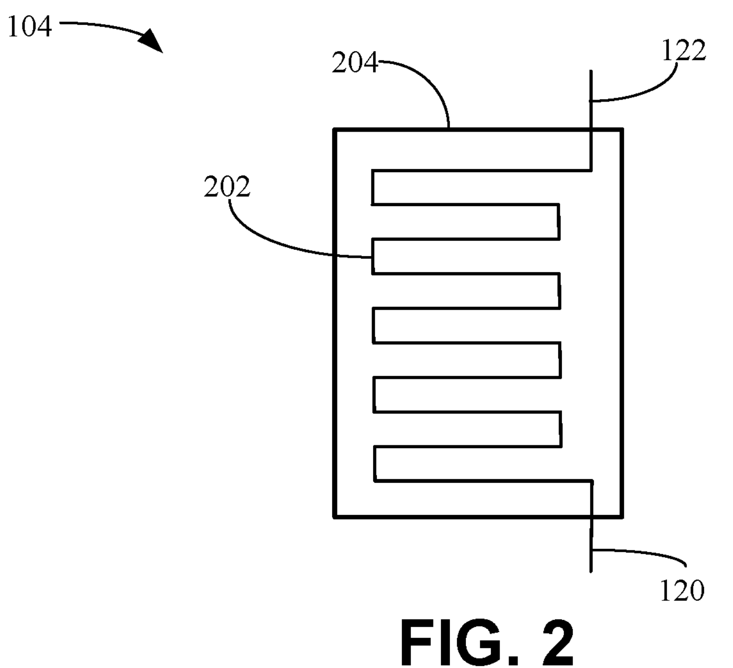
FIG. 2 is a front schematic view of a heat exchange component, according to some embodiments.

FIG. 2 is a front schematic view of heat exchange component 104, according to some embodiments. A principal function of heat exchange component 104 is to allow heat energy to escape a working fluid. This function is performed using several techniques that involve, for example, imposing a circuitous flow path on the working fluid, asserting turbulent flow, and/or providing numerous and efficient heat conducting paths. For example, heat exchange component 104 may include serpentine-shaped chambers or flow paths 202 to carry the working fluid. The heat exchange component may also include heat sink fins thermally attached to housing 204, which contains the working fluid during the working fluid’s passage through the heat exchange component. In some implementations, lanced offset heat fins 112 may be thermally attached (e.g., in physical contact via compression or mechanically attached via screws, bolts, adhesive, etc.) to housing 204. In some particular implementations, heat exchange component 104 may include one or more rows of flattened tubes that extend between tubular headers within housing 204. External fins may be bonded to the exterior of the flattened tubes and in some instances, internal fins within the tubes may be present. Such fins increase surface area within the tubes and provide thermal paths for heat energy to travel from the working fluid flowing within the tubes to the exterior portions of the flattened tubes. In addition, internal fins within the tubes may introduce turbulence to the flow of the working fluid. Turbulence may increase heat transfer efficiency.

Heat energy removed, via the techniques described above, for example, from the working fluid may be absorbed by PCM in PCM component 106. As mentioned previously, a principal function of heat exchange component 104 is to allow heat energy to escape the working fluid. A secondary function, however, is for heat exchange component 104 to allow heat energy to escape the PCM. This function is performed by a working fluid, which is colder than the PCM, flowing in heat exchange component 104. For example, heat energy stored in the PCM may flow in a thermally conductive path in a direction that is colder than the PCM. Accordingly, relatively cold working fluid flowing in heat exchange component 104 may remove heat energy from the PCM, causing the PCM to refreeze (e.g., reset), for example.

Figure 3:
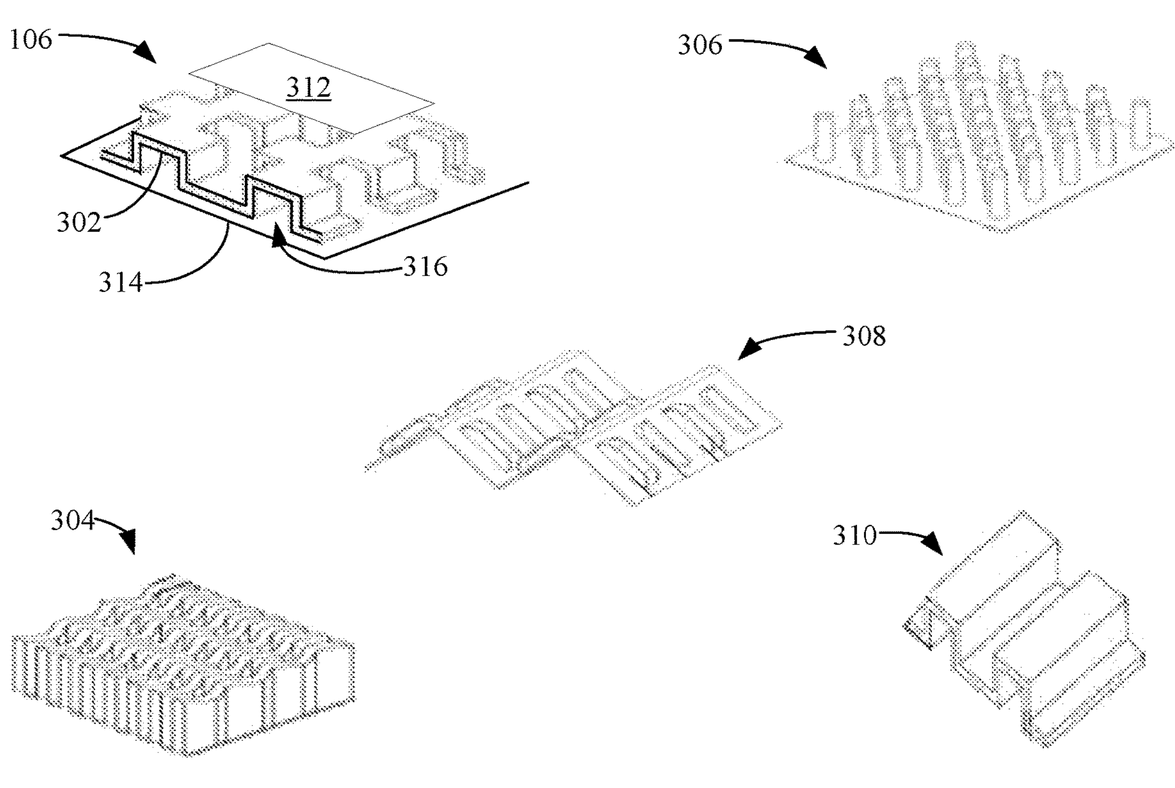
FIG. 3 is a perspective view of a lanced offset fin structure of a PCM component, according to some embodiments.
Figure 4:
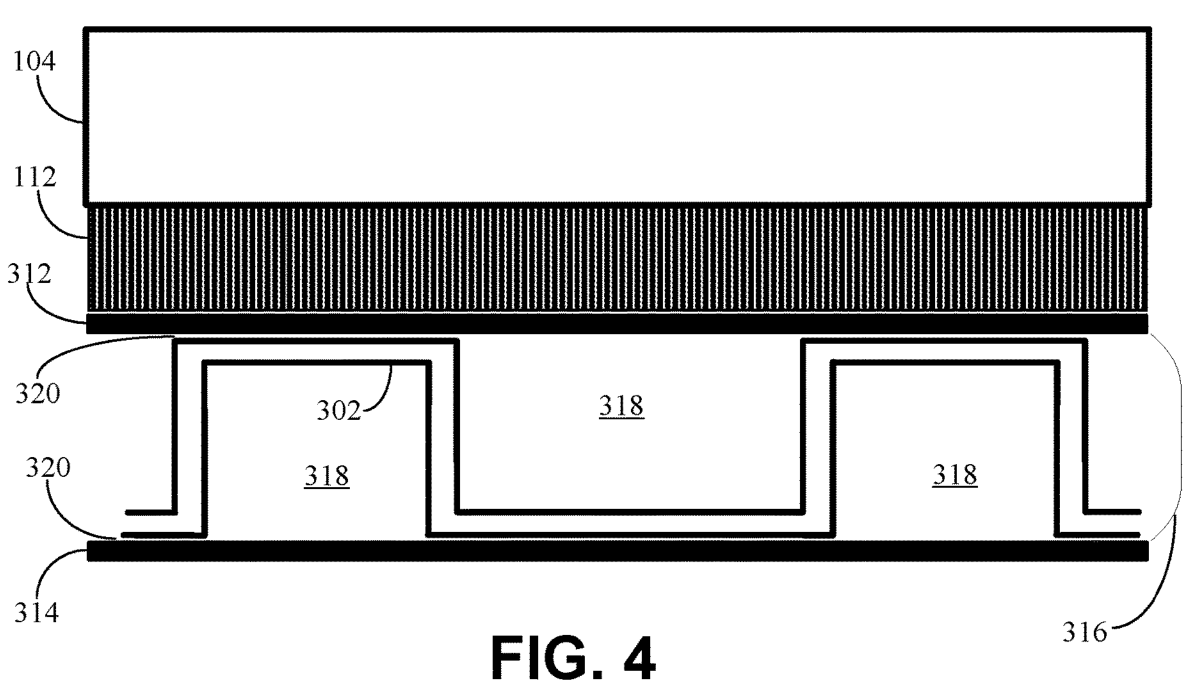
FIG. 4 is a closeup cross-section view of a lanced offset fin structure of a PCM component, according to some embodiments.

FIG. 3 is a perspective view of a lanced offset fin structure 302 of PCM component 106 and FIG. 4 is a close-up cross-section view of the lanced offset fin structure, according to some embodiments. Elements in these figures are not to scale. Lanced offset fin structure 302 may comprise a heat conductive material, such as a metal or metal alloy. Though several particular configurations are illustrated in the FIG. 3, a lanced offset fin structure may have other configurations (e.g., a honeycomb structure, etc.), and claimed subject matter is not limited in this respect. Example configurations illustrated include strip fins (e.g., lanced offset fin structure 302), wavy fins 304, pin fins 306, louvered fins 308, and straight fins 310. Other configurations (not illustrated) include straight fins having a triangular or rectangular layout and a serpentine configuration, just to name a few more examples. A top cover 312 and bottom cover 314 enclose space 316 surrounding lanced offset fin structure 302 and retain PCM within this space. PCM may fill gaps and spaces 318 that are above, below, and to the sides of all parts of the lanced offset fin structure, which resultingly conducts heat energy to all parts of the PCM. In other words, lanced offset fin structure 302 may carry heat energy to substantially all the PCM contained in PCM component 106. Contact regions 320 between lanced offset fin structure 302 and top cover 312 and bottom cover 314, respectively, are thermally conductive and may be attached (e.g., via welding, adhesive, or other mechanical attachment) to each other.

In some implementations, lanced offset heat fins 112 may be adjacent to PCM component 106 and heat exchange component 104. A lanced offset fin structure, similar to or the same as 302, may be incorporated in heat exchange component 104. The lanced offset fin structure in heat exchange component 104 may have, in addition to configurations listed above, a herringbone configuration having fins that are placed sideways to provide a zig-zag path for the flowing working fluid, a serrated and perforated configuration having cuts and perforations in the fins to augment flow distribution and improve heat transfer, or a serpentine configuration, just to name a few examples.

Figure 5:
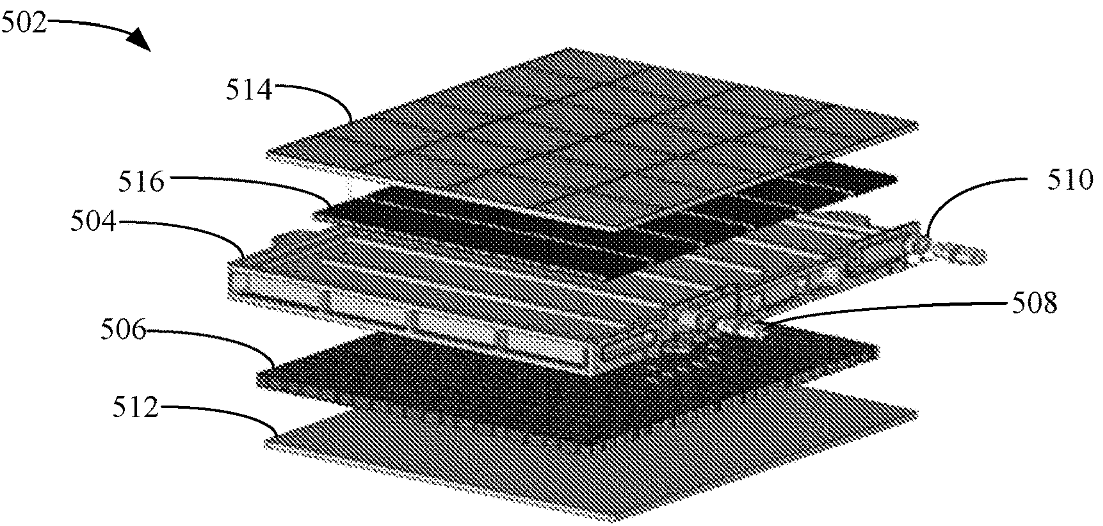
FIG. 5 is an expanded perspective view of a PCM heat exchanger module, according to some embodiments.

FIG. 5 is an expanded perspective view of a PCM heat exchanger module 502, according to some embodiments. Module 502 may include a heat exchange component 504 and a PCM component 506 that are similar to or the same as heat exchange component 104 and PCM component 106, respectively. A working fluid may be supplied to heat exchange component 504 via inlet 508 and the working fluid may exit the heat exchange component via outlet 510. A module bottom cover 512 may be the same as or similar to bottom cover 314 (or may be placed in addition to 314). A module top cover 514 may cover a heat sink layer 516 that overlays heat exchange component 504. In some implementations, another PCM component, similar to or the same as 506, may be placed between top cover 514 and heat sink layer 516.

In some embodiments, the configuration of PCM heat exchanger module 502 is an integrated modular double brazed layout that includes folded fins to distribute heat from a working fluid (e.g., hydraulic fluid) to a PCM. For example, a first PCM component and a second PCM component, respectively on opposite sides of heat exchange component 504, may be mutually assembled by double brazing. Such a configuration may allow for its fabrication by a double brazed technique. Herein, double brazed refers to a fabrication method to incorporate two layers of fins (e.g., just above and just below heat exchange component 504) within a PCM heat exchanger module (e.g., 502), wherein both layers may be brazed at the same time with two corresponding seal plates to complete the module. For comparison, other methods may require a two-step fabrication process that fabricates two layers of fins that are brazed within a single module. Because the bottom of the module may be part of a monolithic machined block of material, it is essentially sealed off at the bottom so only one layer of fins can be brazed at a time. After the first plate is brazed, the second layer of fins can be stacked on top and then sealed off with a second plate that will be brazed. This is a two-step brazing process whereas the "double brazed" process herein generally may only require a one-step brazement process to seal off both sides of the module. Thus, the double brazed architecture may eliminate a second brazing step, thereby reducing complexity, lead times, and costs, for example.

The views below illustrate two sides of the middle plate that separates the two fin layers. Both layers can be brazed at the same time with two corresponding sealplates to complete the module. Here, I'm not showing the fins, channels, and inlets.

Figure 6:
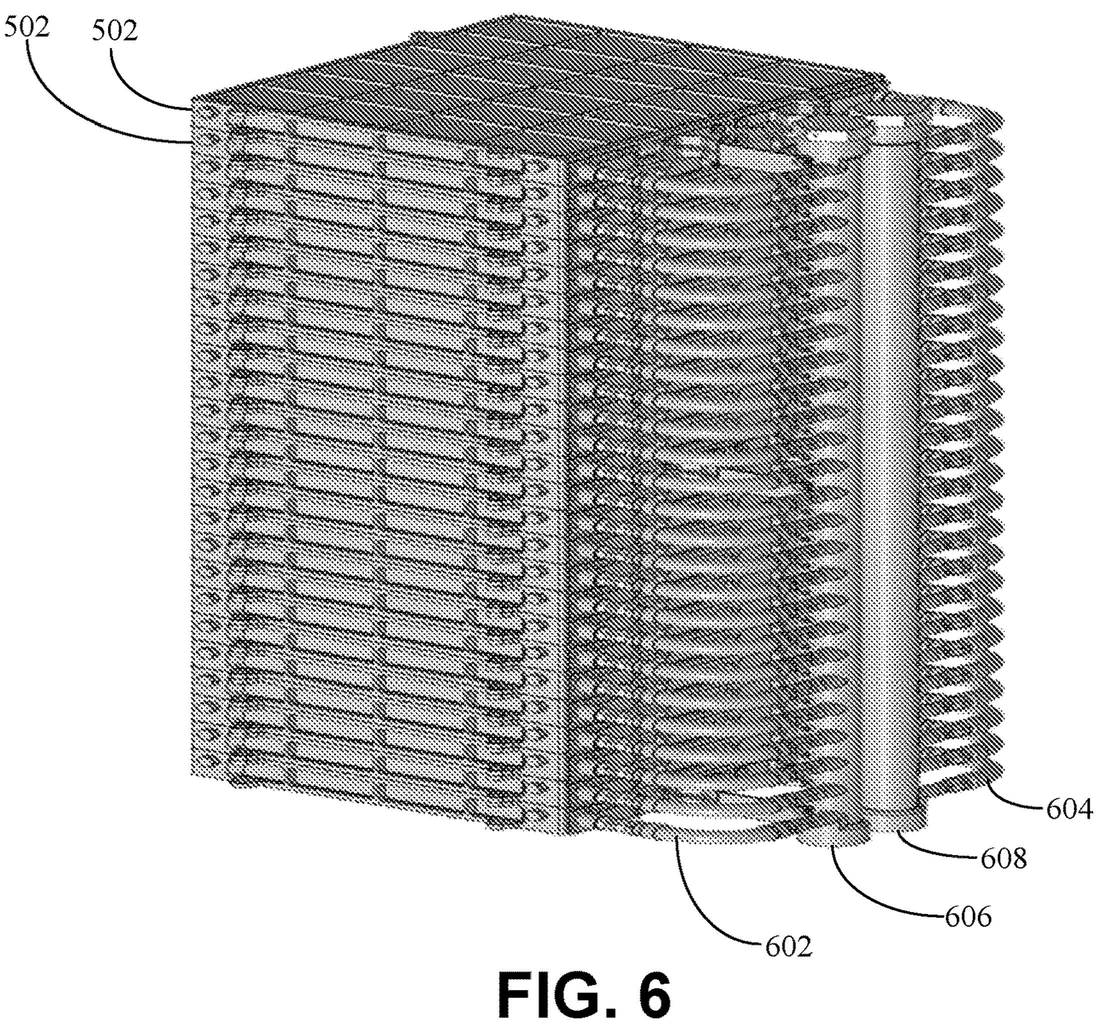
FIG. 6 is a perspective view of multiple PCM heat exchanger modules in a stacked configuration, according to some embodiments.

FIG. 6 is a perspective view of multiple PCM heat exchanger modules 502 assembled in a stacked configuration, according to some embodiments. PCM heat exchanger module 502 may operate singly or may operate as a plurality of such modules stacked upon one another. The number of modules in a stacked configuration may depend on performance required of the stacked modules. For example, a relatively long rocket flight may require a cooling capacity provided by twenty PCM heat exchanger modules 502, whereas a relatively short rocket flight may require a cooling capacity provided by five PCM heat exchanger modules.

FIG. 6 illustrates twenty-five heat exchanger modules 502 as a particular example. Individual heat exchanger modules may be interconnected by working-fluid inlet supply tubes 602 and outlet tubes 604. Working-fluid inlet supply tubes 602 may receive working fluid from a main supply conduit 606 and outlet tubes 604 may draw out the working fluid from the heat exchanger modules 502 and into a main exit conduit 608.

Figure 7:
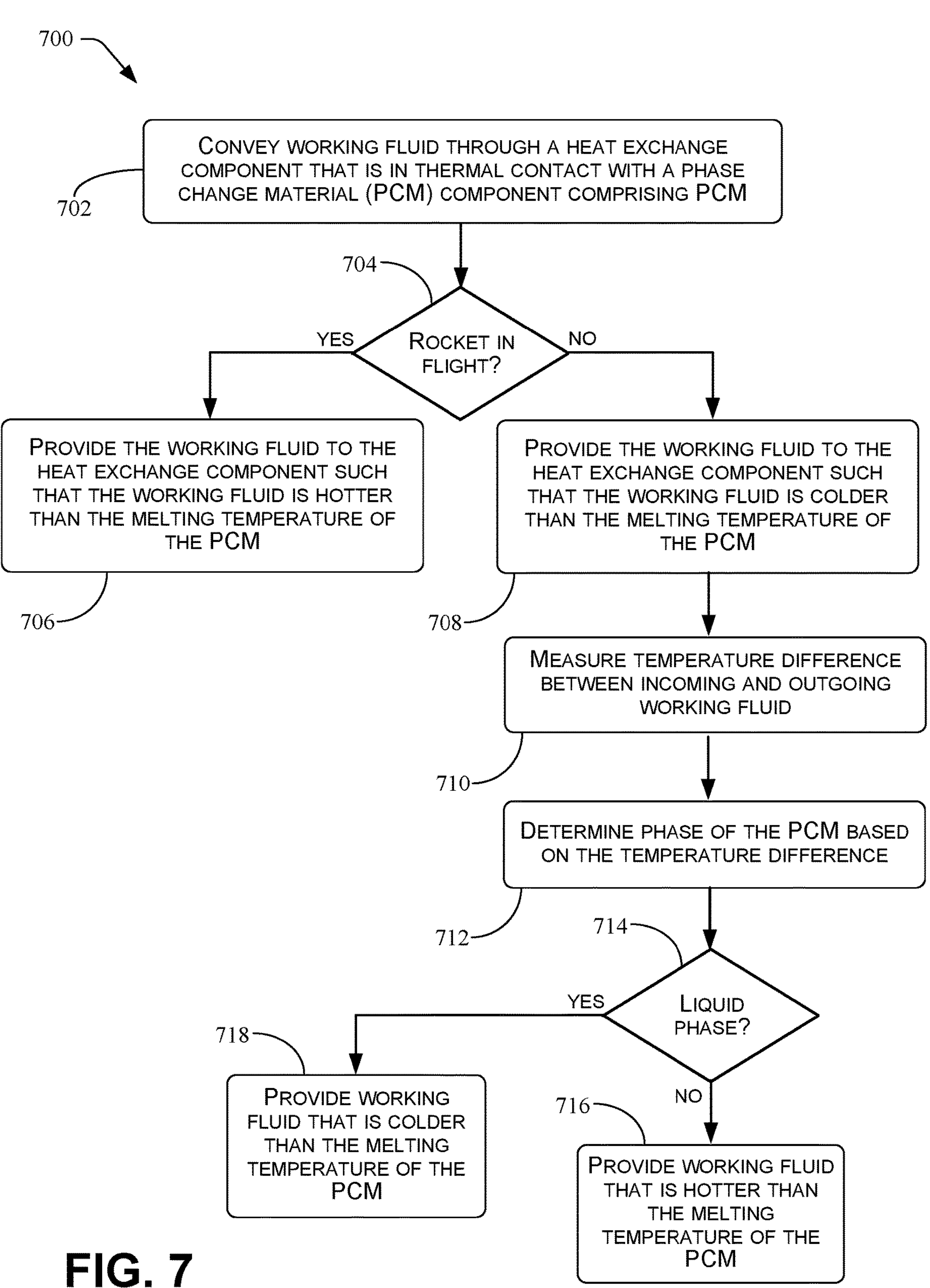
FIG. 7 is a flow diagram of operating a PCM heat exchanger, according to some embodiments.

FIG. 7 is a flow diagram of a process 700 for operating a PCM heat exchanger system aboard a rocket, according to some embodiments. For example, the PCM heat exchanger system may be similar to or the same as heat exchanger system 102 described above. Process 700 may be performed by a controller, which may be a computer processor programmed with executable electronic instructions (e.g., code), for example.

At 702, the controller may convey (e.g., via pumping or other assertive flow process) a working fluid through a heat exchange component of the system. The heat exchange component is in thermal contact with a PCM component that includes PCM. At 704, the controller determines whether the rocket is in flight. If so, then process 700 proceeds to 706, where the controller, via control of one or more valves, for example, provides the working fluid to the heat exchange component such that the working fluid is hotter than the melting temperature of the PCM. For example, during flight, the (primary) function of the PCM heat exchanger system is to cool working fluid, such as hydraulic oil or other fluids that circulate through portions of a rocket's engine or mechanical systems. Accordingly, during flight, the working fluid will be hotter than the PCM.

On the other hand, if the rocket is not in flight, then process 700 proceeds to 708, where the controller, via control of one or more valves, for example, provides the working fluid to the heat exchange component such that the working fluid is colder than the melting temperature of the PCM. For example, after a flight, the rocket may be on a launch pad where the rocket's engine and hydraulic systems, for example, are off and no longer operating. In this situation, the (secondary) function of the PCM heat exchanger system is to cool and reset the PCM that has heated and melted during its previous function of absorbing heat energy from the working fluid during flight. Accordingly, after a flight, a working fluid that is colder than the PCM can freeze the PCM to a reset state so that the PCM heat exchanger system is ready for its primary function of cooling the working fluid during the next flight. The working fluid, whether relatively hot or relatively cold with respect to the PCM, may be the same in both cases. For example, hydraulic fluid will generally be hot during a flight and relatively cold while the rocket rests on a launch pad.

In some implementations, the hot working fluid and the cold working fluid may be different from each other. For example, the cold working fluid flow in a circuit that has exposure to near an external surface of the rocket can be cooled by the relatively cold temperature outside the rocket. The controller may supply working fluid from such a circuit to the PCM heat exchanger system by the selection of valves (e.g., valve 116 open and valve 114 closed), for example. After the PCM is cooled and reset by the cold working fluid, the controller may, such as during a flight, select valves (e.g., valve 116 closed and valve 114 opened) that supply hot working fluid from hydraulics or the engine to the PCM heat exchanger system.

In some embodiments, the controller, at 710, may measure or calculate a temperature difference (e.g., based on the output of temperature sensors) between the working fluid entering (e.g., via pipe 120) the heat exchange component and the working fluid exiting (e.g., via pipe 122) the heat exchange component. At 712, the controller may determine, based on the measured temperature difference, a phase of the PCM. For example, if the temperature of the exiting working fluid is substantially colder than the working fluid going in, then the PCM is still in a solid phase and properly functioning to absorb heat energy by (heat of fusion) melting. Accordingly, from 714, process 700 proceeds to 716, where the controller operates the PCM heat exchanger system to cool working fluid by providing the working fluid, which is hotter than the PCM (or hotter than the melting temperature of the PCM) to the PCM heat exchanger system.

On the other hand, if the temperature of the exiting working fluid is substantially the same as the working fluid going in, then the heat of fusion absorption capacity has been exhausted and the PCM has been melted to a liquid phase. Accordingly, from 714, process 700 proceeds to 718, where the controller operates the PCM heat exchanger system to cool the PCM of the system by providing the working fluid, which is colder than the PCM (or colder than the melting temperature of the PCM) to the PCM heat exchanger system.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

I claim:

1. A heat exchanger system for a rocket, the heat exchanger system comprising:
- a heat exchange component configured to carry a working fluid;
- a first phase change material (PCM) component comprising PCM, wherein the first PCM component is in thermal contact with a first side of the heat exchange component;
- a second PCM component comprising PCM, wherein the second PCM component is in thermal contact with a second side, opposite the first side, of the heat exchange component, and wherein the first PCM component, the heat exchange component, and the second PCM component are mutually interconnected by double brazing; and
- a working-fluid supply system configured to selectively provide the working fluid to the heat exchange component to alternately heat and cool the first and the second PCM components depending on an operating state of the rocket, such that the working fluid is i) hotter than the melting temperature of the PCM during flight of the rocket and ii) colder than the melting temperature of the PCM when the rocket is stationary on a launch pad for the rocket.

2. The heat exchanger system of claim 1, wherein the PCM component comprises a support matrix having a network of cavities at least partially filled with the PCM.

3. The heat exchanger system of claim 2, wherein the support matrix has a honeycomb structure.

4. The heat exchanger system of claim 2, wherein the support matrix is a lanced offset fin structure.

5. The heat exchanger system of claim 1, wherein the working fluid is a hydraulic oil.

6. The heat exchanger system of claim 1, wherein the working fluid sup-ply system comprises valves that operate to select either the working fluid that is hotter than the melting temperature of the PCM or the working fluid that is colder than the melting temperature of the PCM.

7. The heat exchanger system of claim 6, wherein the selection by the valves is based, at least in part, on a determination of location of the rocket.

8. The heat exchanger system of claim 1, further comprising lanced offset heat fins between the heat exchange component and the PCM component.

9. The heat exchanger system of claim 1, wherein the heat exchange com-ponent comprises serpentine-shaped chambers to carry the working fluid.

10. A method of operating a heat exchanger in a rocket, the method comprising:
- conveying working fluid through a heat exchange component that is in thermal contact with a phase change material (PCM) component comprising PCM; and
- selectively providing the working fluid to the heat exchange component to alternately heat and cool the PCM component depending on an operating state of the rocket, such that the working fluid is i) hotter than the melting temperature of the PCM during flight of the rocket and ii) colder than the melting temperature of the PCM when the rocket is stationary on a launch pad for the rocket, wherein the working fluid supply system comprises valves that are configured to operate to select either the working fluid that is hotter than the melting temperature of the PCM or the working fluid that is colder than the melting temperature of the PCM, and wherein the selection by the valves is based, at least in part, on a determination of location of the rocket and a determined phase of the PCM.

11. The method of claim 10, wherein the PCM component comprises a lanced offset fin structure having a network of cavities at least partially filled with the PCM.

12. The method of claim 10, further comprising:

measuring a temperature difference between the working fluid entering the heat exchange component and the working fluid exiting the heat exchange component; and determining, based on the measured temperature difference, a phase of the PCM.

13. The method of claim 12, further comprising selecting, based at least in part on the determined phase, either the working fluid that is hotter than the melting temperature of the PCM or the working fluid that is colder than the melting temperature of the PCM.

* * * * *